United States Patent
Brooks et al.

(10) Patent No.: US 10,589,658 B2
(45) Date of Patent: Mar. 17, 2020

(54) TIE-DOWN STRAP TENSIONERS

(71) Applicants: Ray G. Brooks, Bedford, TX (US); Timothy W. Brooks, Arlington, TX (US)

(72) Inventors: Ray G. Brooks, Bedford, TX (US); Timothy W. Brooks, Arlington, TX (US)

(73) Assignee: CONVEY, INC., Euless, TX (US)

(*) Notice: Subject to any disclaimer, the term of this patent is extended or adjusted under 35 U.S.C. 154(b) by 0 days.

(21) Appl. No.: 15/994,799

(22) Filed: May 31, 2018

(65) Prior Publication Data

US 2019/0366906 A1 Dec. 5, 2019

(51) Int. Cl.
*B60P 7/08* (2006.01)
*B60P 7/10* (2006.01)
*B60P 7/12* (2006.01)

(52) U.S. Cl.
CPC .............. *B60P 7/0823* (2013.01); *B60P 7/10* (2013.01); *B60P 7/12* (2013.01)

(58) Field of Classification Search
CPC ....... B60P 7/083; B60P 7/0823; B60P 7/0846; B60P 7/0861; B60P 7/0838; B60P 7/0853; B60P 7/08
USPC .... 410/100, 103, 97, 98, 101, 23, 96, 9, 66; 245/218, 223, 217, 247, 266, 238
See application file for complete search history.

(56) References Cited

U.S. PATENT DOCUMENTS

| | | | | |
|---|---|---|---|---|
| 5,584,623 A | * | 12/1996 | Nadherny | B60P 7/0869 410/155 |
| 6,029,410 A | * | 2/2000 | Westberg, II | E06B 7/00 206/325 |
| 6,611,995 B2 | * | 9/2003 | Jackson | B60P 7/0823 206/388 |
| 7,431,547 B2 | * | 10/2008 | Geary | B32B 27/06 410/41 |
| 2006/0108249 A1 | * | 5/2006 | Riddleburgh | B65D 81/053 206/453 |

* cited by examiner

*Primary Examiner* — D Glenn Dayoan
*Assistant Examiner* — Sunsurraye Westbrook
(74) *Attorney, Agent, or Firm* — W. Thomas Timmons (57) ABSTRACT

A tie-down strap tensioner maintains a desired strap tension on cargo when placed on a truck flatbed or sea transport. Tie-down strap tensioners are made of rubbery-type resins that remain compressive in the amount of hand applied pressure on the strap assigned to a given cargo container shape. The tie-down strap tensioner has at least three different embodiments: one is for round or radius corners such barrels, one is for square corners such as boxes, and one is for either or both round and square corners. Each tie-down strap tensioner has an upper surface and a lower surface and the lower surface has extending members that are compressive in amount of tension applied to the strap thus accommodates the shape of the cargo container selected which remains expandable to its original shape.

7 Claims, 9 Drawing Sheets

TIE-DOWN STRAP TENSIONERS

CROSS-REFERENCE TO RELATED APPLICATIONS

Statement Regarding Federally Sponsored Research or Development

Not Applicable

INCORPORATION-BY-REFERENCE OF MATERIAL SUBMITTED ON A COMPACT DISC

Not Applicable

BACKGROUND OF THE INVENTION

1. Field of the Invention

Whereas the present invention is a device hereinafter referred to as the tie-down strap tensioners, is so designed to be attach to tie-down straps which each is made from a rubbery resin that remains compressive and expandable associated with the amount of tension placed on the strap that uniquely provides a tight feature on strap down cargo as placed on flatbed trucks or sea transports.

2. Description of Related Art

In the United States alone, millions of pounds of cargo to include items such as barrels and/or boxes are transported by flatbed trucks or sea transports on a daily basis. The only available product on the market today to secure these type cargo (regardless of type) on flatbed trucks or sea transports, is the tie-down strap that by design totally lacks in capability or ability to remain tight requiring added and costly time during transport phases. However, tie-down straps as presently manufactured do not safely secure the cargo. This is particular the case if the cargo has cylindrical shape such as containers. Tie-down straps without use of the present invention are able to move and slip and can repeatedly become loose and slide off the truck.

A prior art invention of likeness, becomes traceable to U.S. Pat. No. 9,302,607 that in general specifies a tie-down straps associated with blocks that only relates to securing drums (not boxes) whereas the blocks adapt to edges of one particular drum that does not include: 1) A dimensional feature to adapt to other drums with different dimensions or edge features; 2) Adjustable feature to adapt from a metal made drum to a plastic made drum and 3) No specifications or claims to accommodate other type containers of different shapes such as boxes. Further, the specifications and claims have no definition of the blocks from becoming loose associated with tie-down straps traceable to environmental conditions such as heat and directional vibration forces caused by truck acceleration and deceleration while the truck is in motion.

BRIEF SUMMARY OF THE INVENTION

The purpose of a tie-down strap tensioner according to the present invention is to maintain a desired tension on tie-down straps for cargo that is mounted on flatbed trucks or sea transports to prevent looseness, dislodging and/or displacement of the cargo during transport phases. A tie-down strap tensioner according to the present invention has at least three different design shapes. One is to maintain tension on tie-down straps associated with cargo having round corners such as barrels, one has purpose to maintain tension on tie-down straps having square corners such as boxes and one has the purpose to maintain tension of tie-down straps having either or both square and round corners. Whereas either or all types of tensioners have the purpose to maintain required tightness on cargo located on flatbed trucks or sea transports during entire period of shipment phases. Whereas each or all tie-down strap tensioners are made from a rubbery polymer resin that remains compressive and expandable associated with the tension applied on a tie-down strap. Regardless of type tie-down strap tensioner selected, each has an upper surface and a lower surface and the lower surface which both surfaces remain compressible and expandable associated with tension applied to a tie-down strap holding the cargo on a flatbed truck or sea transport during transport phases. Compressibility of each embodiment of tie-down strap tensioners according to the current invention defines the best method for safety of cargo located on flatbed trucks or sea transports during transport phases.

These and other objects, advantages and features of this invention will be apparent from the following description taken with reference to the accompanying drawing, wherein is shown a preferred embodiment of the invention.

BRIEF DESCRIPTION OF THE SEVERAL VIEWS OF THE DRAWING

FIG. 12A is a detailed view of the tie-down strap tensioner of FIG. 11 in place on the barrel;

DETAILED DESCRIPTION OF THE INVENTION

Figure 1:
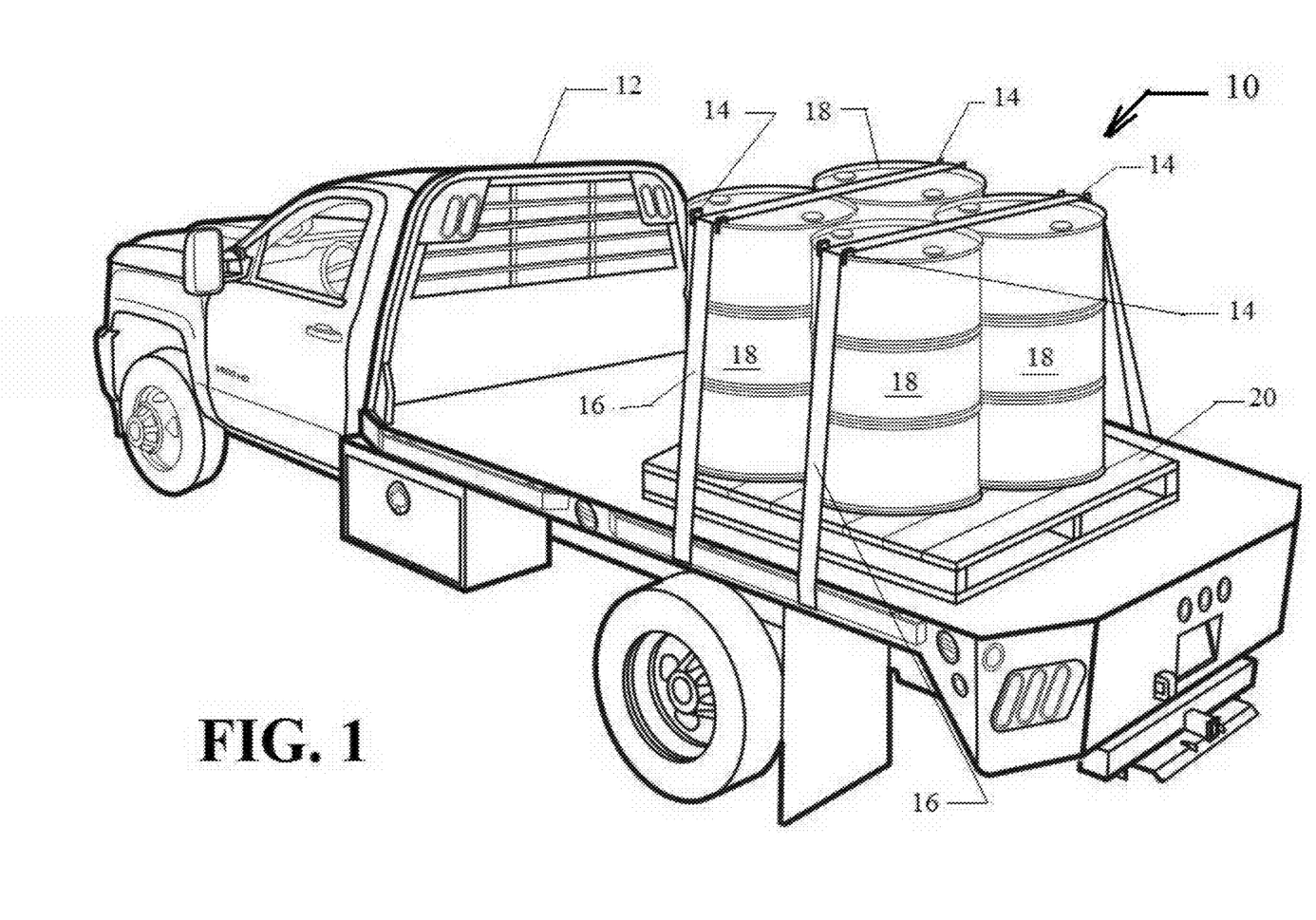
FIG. 1 is a is an illustrative view of a truck with containers having round corner with continuous radius such as barrels as being secured by tie-down straps associated with tie-down strap tensioners according to the present invention.

Referring now to the drawing and in particular to FIG. 1, a system for securely tying down containers such as barrels 18 on a truck such as flatbed truck 12 is referred to generally by reference numeral 10. System 10 includes straps 16 going over two barrels 18 and secured by strap tensioners 14 on the outside edges of the two barrels. The purpose of a tie-down strap tensioner 14 according to the present invention is to maintain a desired tension on tie-down straps 16 for cargo that is mounted on flatbed trucks or sea transports to prevent looseness, dislodging and/or displacement of the cargo during transport phases. A tie-down strap tensioner according to the present invention has at least three different design shapes. One is to maintain tension on tie-down straps associated with cargo having round corners such as barrels, one has purpose to maintain tension on tie-down straps having square corners such as boxes and one has the purpose to maintain tension of tie-down straps having either or both square and round corners. Whereas each or all types of tensioners have the purpose to maintain required tightness on cargo located on flatbed trucks or sea transports during entire period of shipment phases. Whereas each or all tie-down strap tensioners are made from a rubbery polymer resin that remains compressible and expandable associated with the tension applied on a tie-down strap. Regardless of type tie-down strap tensioner selected, each has an upper surface and a lower surface and the lower surface which both surfaces remain compressible and expandable associated with tension applied to a tie-down strap holding the cargo on a flatbed truck or sea transport during transport phases. Compressibility of each embodiment of tie-down strap tensioners according to the current invention defines the best method for safety of cargo located on flatbed trucks or sea transports during transport phases.

Figure 2:
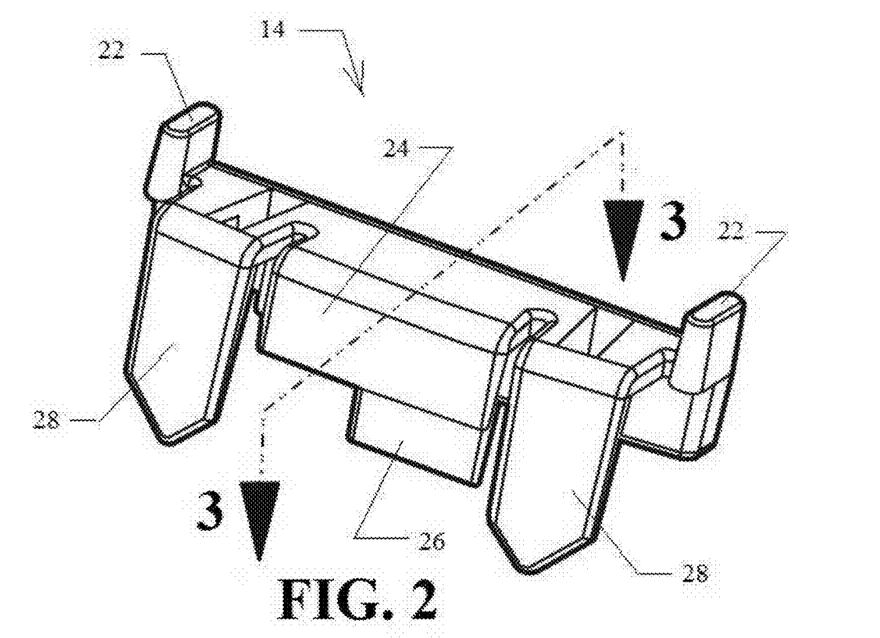
FIG. 2 is an illustrative view of a tie-down strap tensioner according to the present invention to accommodate the continuous radius as illustrated in FIG. 1.
Figure 3:
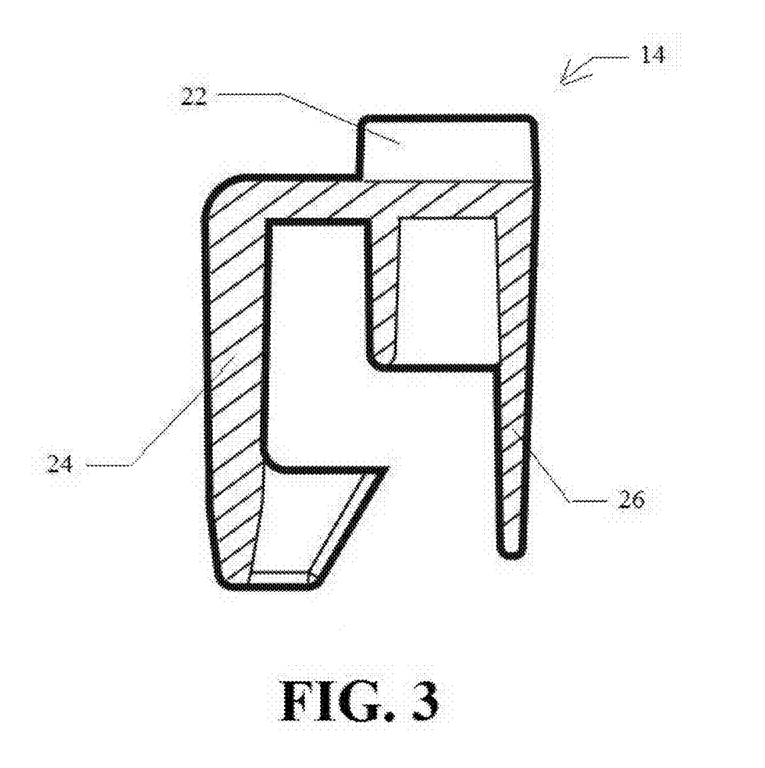
FIG. 3 is a cross-sectional view taken along line 3-3 of FIG. 2 of the tie-down strap tensioner.

Referring now to FIG. 2 and FIG. 3, tie-down strap tensioner 14 includes two strap guides 22, an outside edge gripper 24, a tongue 26 and two outside edge tensioners 28. Tongue 26 presses against the top surface of a barrel and tension is applied to the tie-down straps 16 until the tongue begins to give, applying extra pressure to the top of the barrel. The compressibility of the tongue keeps the strap tension on the barrel.

Figure 4:
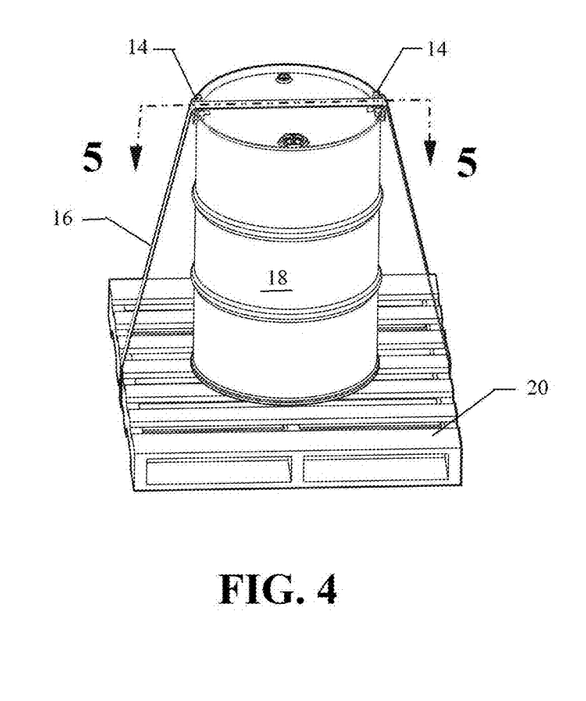
FIG. 4 is a barrel illustrated as secured by a tie-down strap to a pallet employing two tie-down strap tensioners having purpose to maintain the intended tension placed on the strap.
Figure 5:
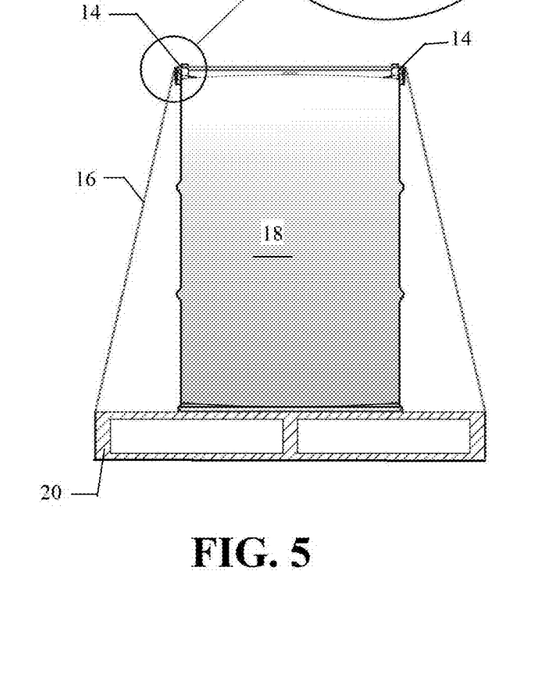
FIG. 5 is a cross-sectional view taken along line 5-5 of FIG. 4 of the barrel associated with a tie-down strap having two tie-down strap tensioners.
Figure 5A:
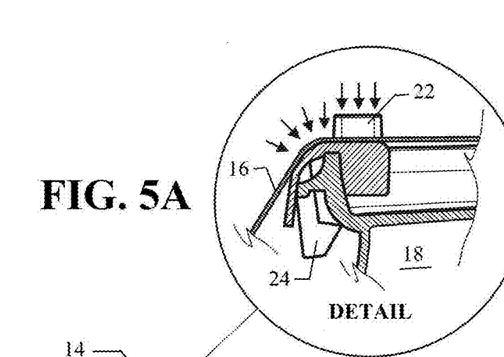
FIG. 5A is a detailed view of a tie-down strap tensioner in place on the barrel.

Referring now to FIG. 4, FIG. 5 and FIG. 5A, in which like parts have like numbers, a single barrel 18 is held down by a strap 16 and two tie-down strap tensioners 14, which are slightly different from those shown in FIG. 2 and FIG. 3.

Figure 6:
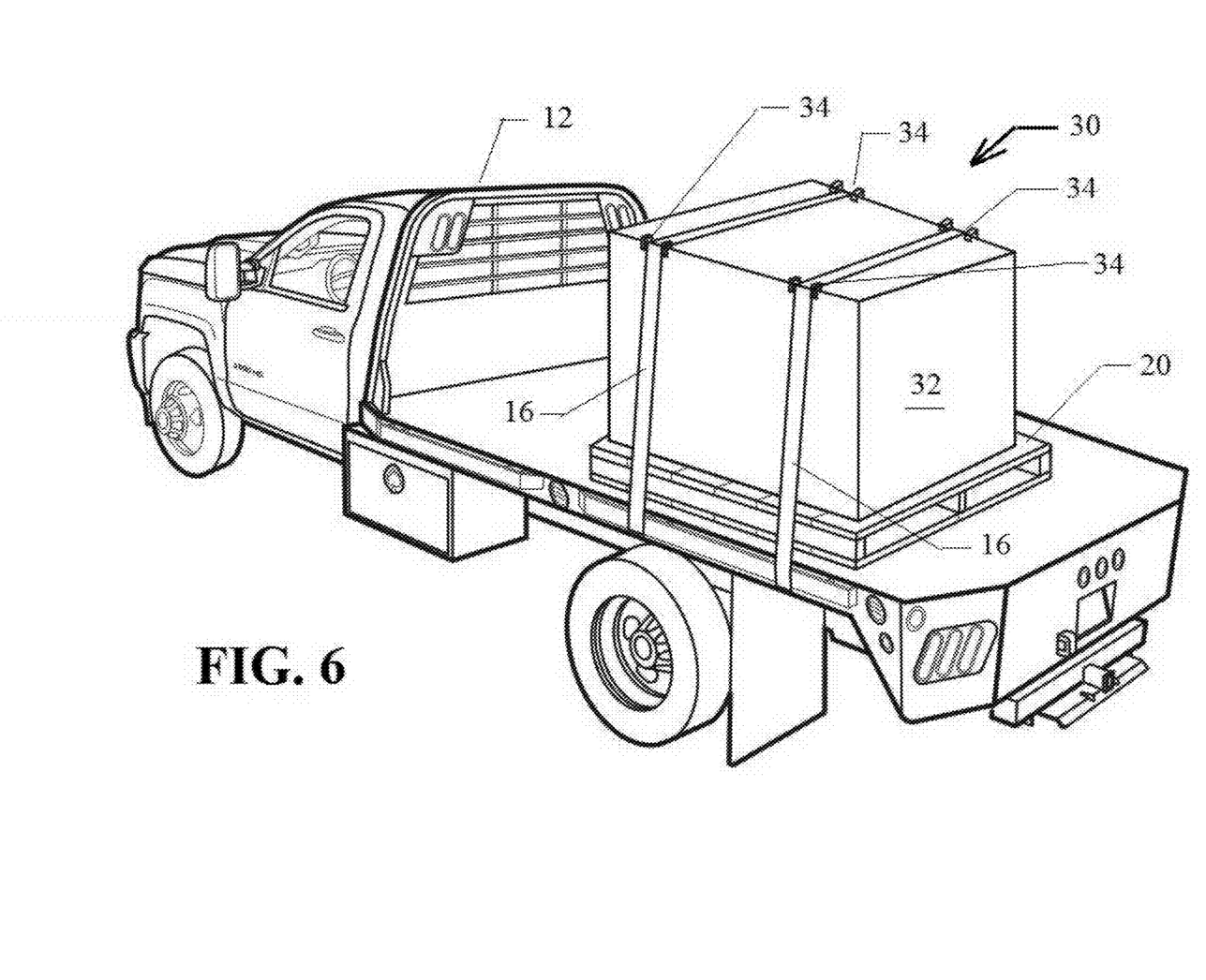
FIG. 6 is an illustrative view of a truck with containers having square corners such as boxes as being secured by tie-down straps associated with tie-down strap tensioners.
Figure 7:
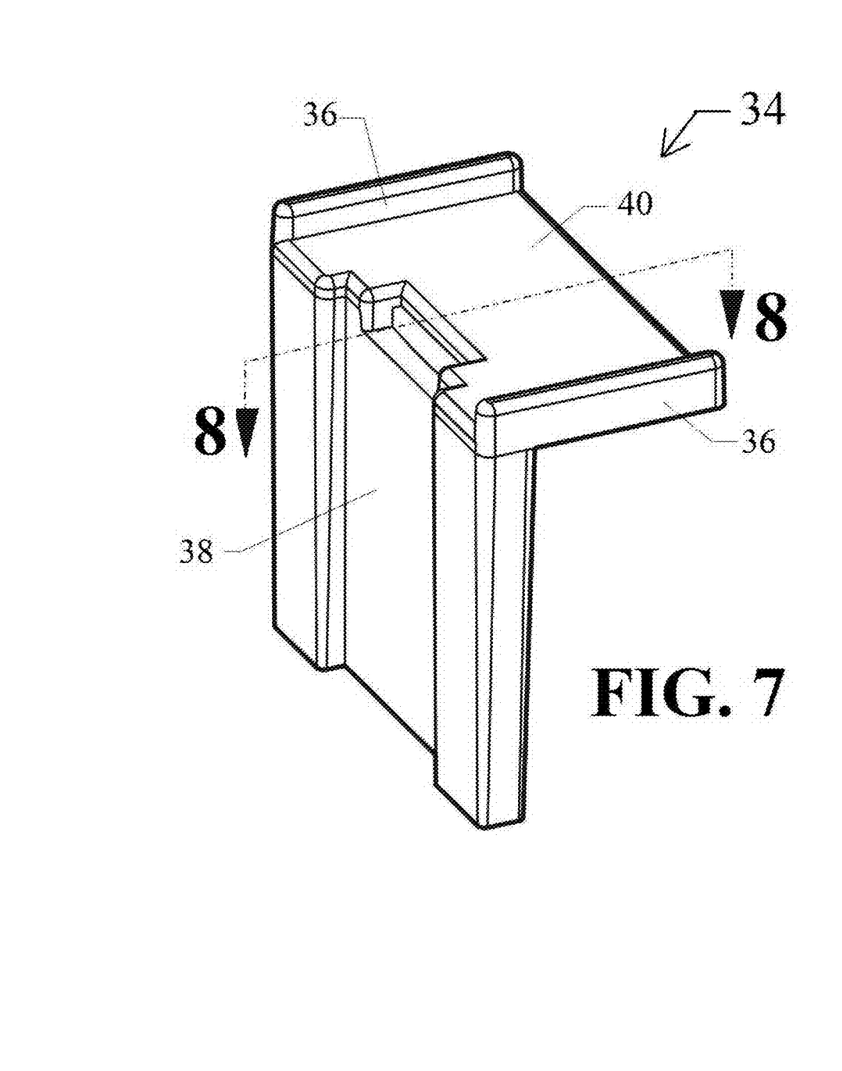
FIG. 7 is an illustrative view of a tensioner so designed in a manner to accommodate the square corners.
Figure 8:
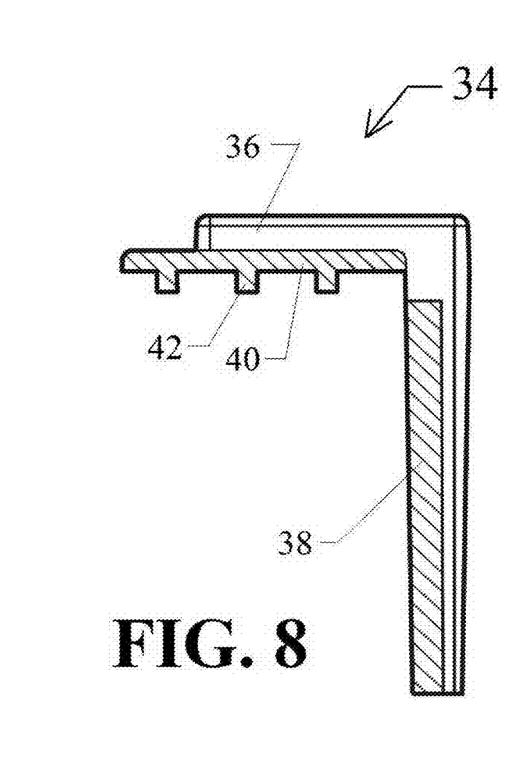
FIG. 8 is a cross-sectional view of the tie-down strap tensioner.

Referring to FIG. 6, a large box 32 is held down by two tie-down straps 16 and four tie-down strap tensioners 34. Referring also to FIG. 7 and FIG. 8, a tie-down strap tensioner 34 includes two strap guides 36, side gripper 38 and top gripper 40 along with gripper teeth 42.

Figures 9, 10:
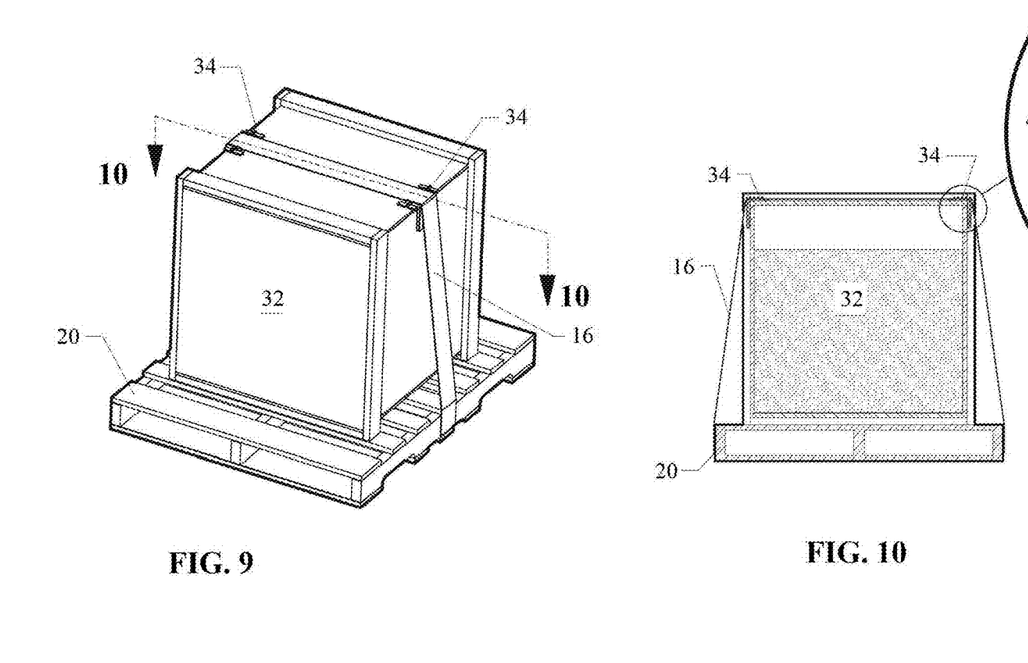
FIG. 9 is a box illustrated as secured by a tie-down strap to a pallet employing two tie-down strap tensioners having purpose to maintain the intended tension placed on the strap.
FIG. 10 is a cross-sectional view of the box associated with a tie-down strap having two tie-down strap tensioners.
Figure 10A:
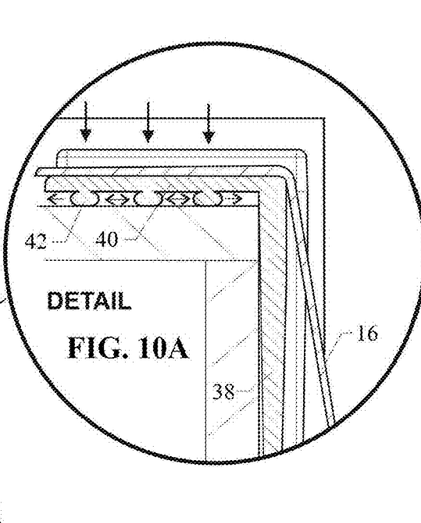
FIG. 10A is a detail view of a strap tensioner positioned on the box.

Referring to FIG. 9, FIG. 10 and FIG. 10A, when strap tension is high, gripper teeth 42 are depressed. The compressibility of the gripper teeth maintains the strap tension.

Figure 11:
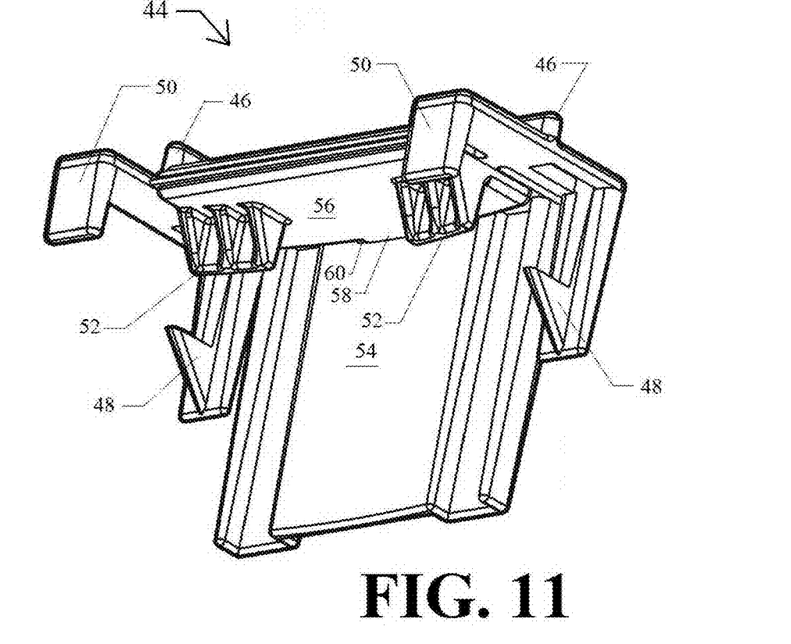
FIG. 11 is a perspective view of a tie-down strap tensioner according to the present invention so designed to adapt to either cargo having round or square corners, shown in a configuration for round corners such as barrels.
Figure 12:
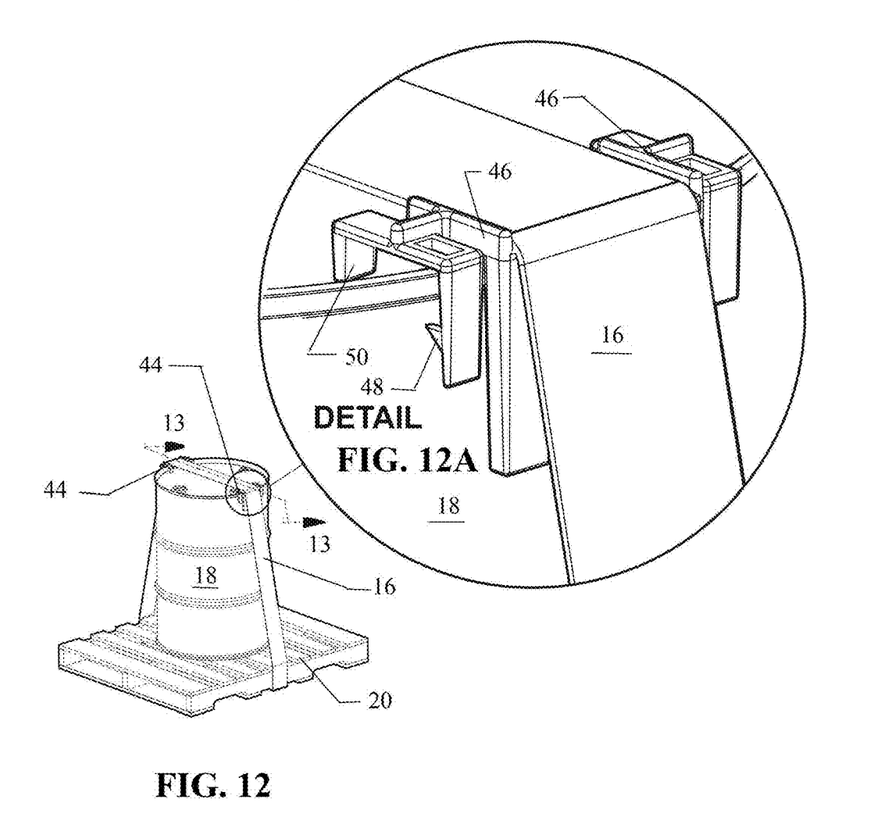
FIG. 12 is a perspective view of the tie-down strap tensioner of FIG. 11 as applied to a barrel having round corners.
Figure 13:
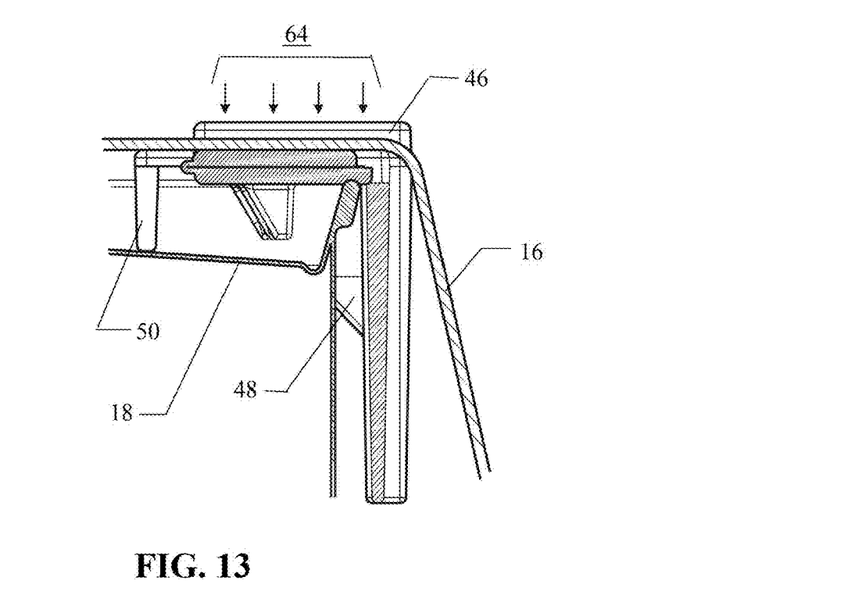
FIG. 13 is a cross-section view of the tie-down strap tensioner illustrating compressibility as applied on the round corners of the barrel.

Referring to FIG. 11, a tie-down strap tensioner is referred to generally by reference numeral 44. Tie-down strap tensioner 44 includes two strap guides 46, two outside edge grippers 48, two tongues 50, two inside grippers 52 and a back gripper 54. The tie-down strap tensioner 14 is shown in the configuration for barrel shaped containers. The compressibility of two tongues keeps the strap tension on the barrel shaped container. An inside upper surface 56 has a projection 58, which inserts in a slot 60 to maintain tie-down strap tensioner 44 in the barrel configuration. Referring also to FIGS. 12, 12A and 13, tie-down strap 16 tensioner 44 onto barrel 18, downward pressure 64 from tie-down strap 16 puts two tongues 50 compressed against the top of barrel 18.

Figure 11A:
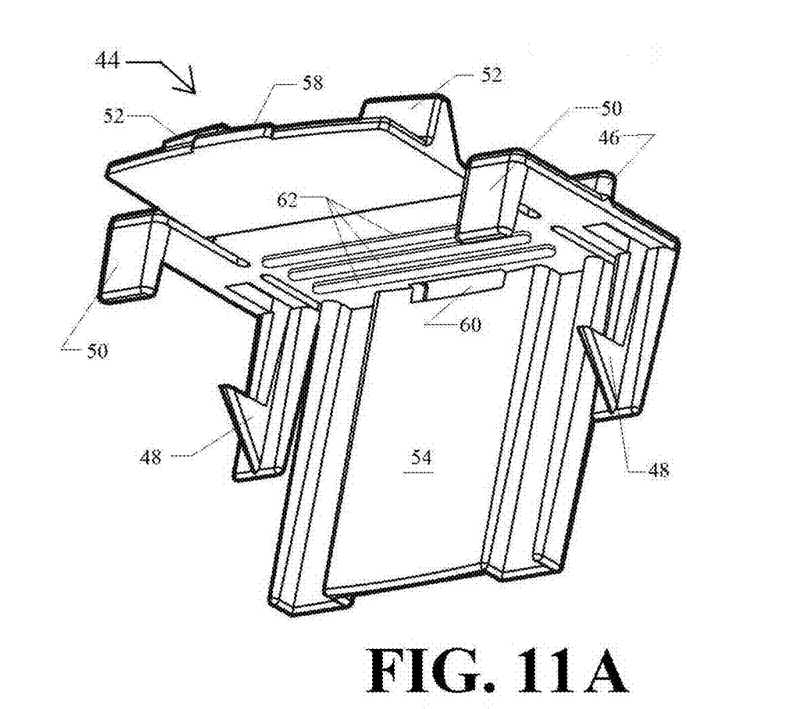
FIG. 11A is a perspective view of the tie-down strap tensioner according to FIG. 11 in a configuration for use on boxes.
Figures 14, 14A:
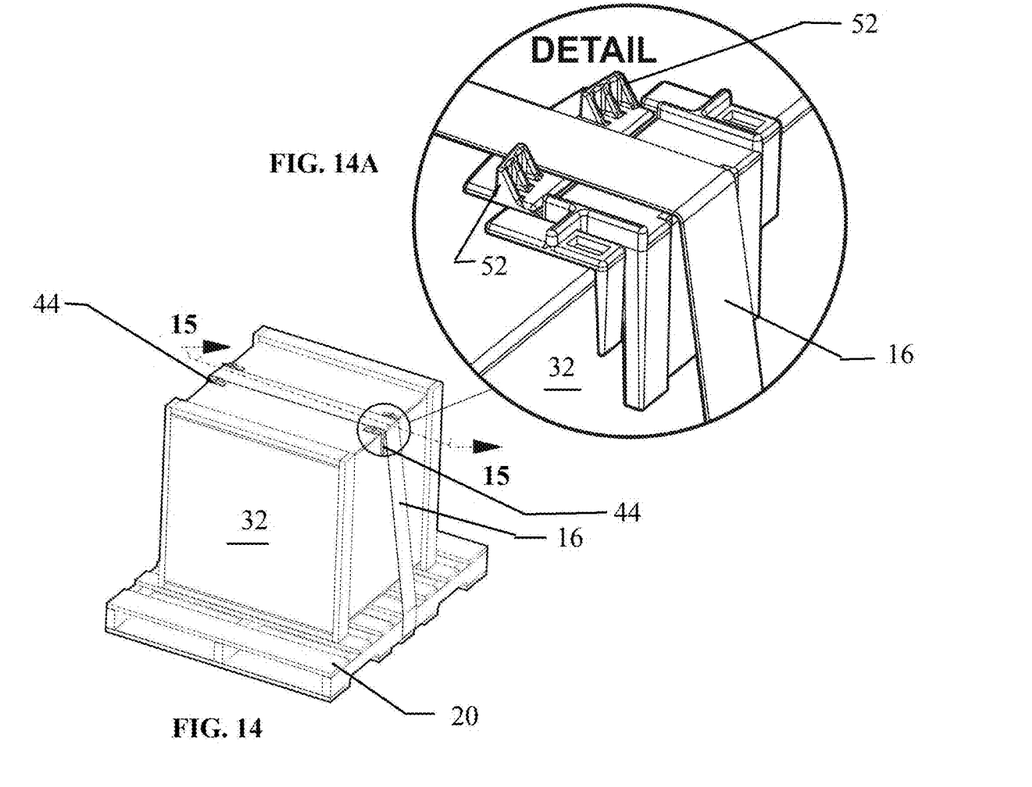
FIG. 14 is an illustration and detail view of the same the tie-down strap tensioner of FIG. 11 as applied to cargo having square corners such as a box.
FIG. 14A is a detailed view of the tie-down strap tensioner of FIG. 11 in place on the box.
Figure 15:
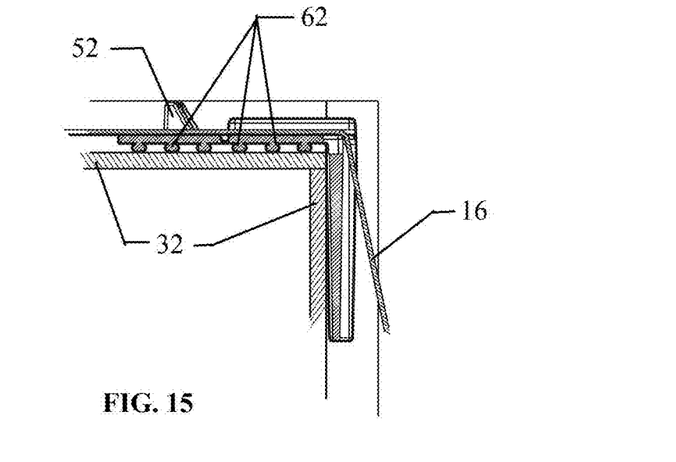
FIG. 15 is a cross-section view of the tie-down strap tensioner taken along line 15-15 of FIG. 14, illustrating compressibility as applied on the square corners of the cargo such as a box.

Referring now to FIG. 11A, tie-down strap tensioner 44 is shown configured for a box shaped container. Projection 58 has been removed from slot 60 so that what was inside upper surface 56 has swung to the outer top surface. Now, in addition to the compressibility of the two tongues 50, the box configuration also has teeth 62, which compress against a box, helping to maintain the tension in the strap. Referring also to FIGS. 14, 14A and 15, tie-down strap 16 tensioner 44 hold down box 32. Teeth 62 are compressed against box 32, keeping tie-down strap 16 in tension.

From the foregoing it will be seen that this invention is well adapted to attain all of the ends and objectives hereinabove set forth, together with other advantages which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the figures of the accompanying drawings is to be interpreted as illustrative and not in a limiting sense.

The invention claimed is:

1. A tie-down strap tensioner, the tie-down strap designed for holding a cargo on a flatbed truck or a sea transport, comprising in combination:

an upper surface over the cargo; a lower surface extending over the cargo, wherein both surfaces remain compressible and expandable associated with tension applied to the tie-down strap holding the cargo on a flatbed truck or sea transport during transport phases; and the tie-down strap tensioner substantially consist of a rubbery polymer resin, whereby the tie-down strap tensioner maintains a pressure on the strap and secures the cargo;

an outside edge gripper to grip the outer edge of the barrel and to hold onto the top edge of a barrel containing the cargo; and a flexible tongue extending from opposite the gripper and downward over the top of the barrel and maintains pressure against the top of the barrel containing the cargo thus maintaining the tension in the strap.

2. A tie-down strap tensioner according to claim 1, further comprising:
   two strap guides on the top of the tie-down strap tensioner; and
   two outside edge tensioners to further maintain the tension in the strap.

3. A tie-down strap tensioner, the tie-down strap designed for holding a cargo on a flatbed truck or a sea transport, comprising in combination:
   an upper surface over the cargo; a lower surface extending over the cargo, wherein both surfaces remain compressible and expandable associated with tension applied to the tie-down strap holding the cargo on a flatbed truck or sea transport during transport phases; and
   the tie-down strap tensioner substantially consist of a rubbery polymer resin, whereby the tie-down strap tensioner maintains a pressure on the strap and secures the cargo;
   a gripper to hold onto the top edge of a box containing the cargo; and
   flexible teeth that maintain pressure against the top of the box containing the cargo.

4. A tie-down strap tensioner according to claim 3, further comprising:
   two strap guides: and
   a side gripper.

5. A tie-down strap tensioner, the tie-down strap designed for holding a cargo on a flatbed truck or a sea transport, comprising in combination:
   an upper surface over the cargo; a lower surface extending over the cargo, wherein both surfaces remain compressible and expandable associated with tension applied to the tie-down strap holding the cargo on a flatbed truck or sea transport during transport phases; and
   the tie-down strap tensioner substantially consist of a rubbery polymer resin, whereby the tie-down strap tensioner maintains a pressure on the strap and secures the cargo;
   a first configuration comprising:
   a gripper to hold onto the outside top edge of a barrel containing the cargo; and
   at least one flexible tongue extending from opposite the gripper and downward over the top of the barrel that maintains pressure against the top of the barrel containing the cargo; and
   a second configuration comprising:
   a gripper to hold onto the top edge of a box containing the cargo; and
   flexible teeth that maintain pressure against the top of the box containing the cargo.

6. A tie-down strap tensioner according to claim 5, further comprising:
   two strap guides;
   two outside edge grippers:
   two tongues;
   two inside grippers; and
   a back gripper.

7. A tie-down strap tensioner according to claim 5, further comprising:
   a projection;
   a slot 60, wherein the projection has been removed from the slot so that what was inside upper surface has swung to the outer top surface; and
   teeth, which compress against a box, helping to maintain the tension in the strap.

* * * * *